F. H. C. MEY.
Velocipede.

No. 109,644.  Patented Nov. 29, 1870.

United States Patent Office.

F. H. C. MEY, OF BUFFALO, NEW YORK.

Letters Patent No. 109,644, dated November 29, 1870; antedated September 17, 1870.

IMPROVEMENT IN VEHICLES.

The Schedule referred to in these Letters Patent and making part of the same.

*To all whom it may concern:*

Be it known that I, F. H. C. MEY, of Buffalo, in the county of Erie and State of New York, have invented a new and improved Dog-Power Vehicle; and I do hereby declare that the following is a full, clear, and exact description thereof, which will enable others skilled in the art to make and use the same, reference being had to the accompanying drawing forming part of this specification.

This invention relates to vehicles which move from place to place on roads, pavements, &c., and consists in an improved construction thereof.

Similar letters of reference indicate corresponding parts.

A is the driving-wheel, which in this instance is in the front of a vehicle having three wheels, but may be in the rear, if preferred, or in any other location.

B is the treading-rim, made in any suitable way, and attached to the wheel A, preferably within the outer rim C, so that it will work a short distance above the ground, to avoid contact therewith, on which it would work badly owing to the breadth of the rim.

Figure 1:
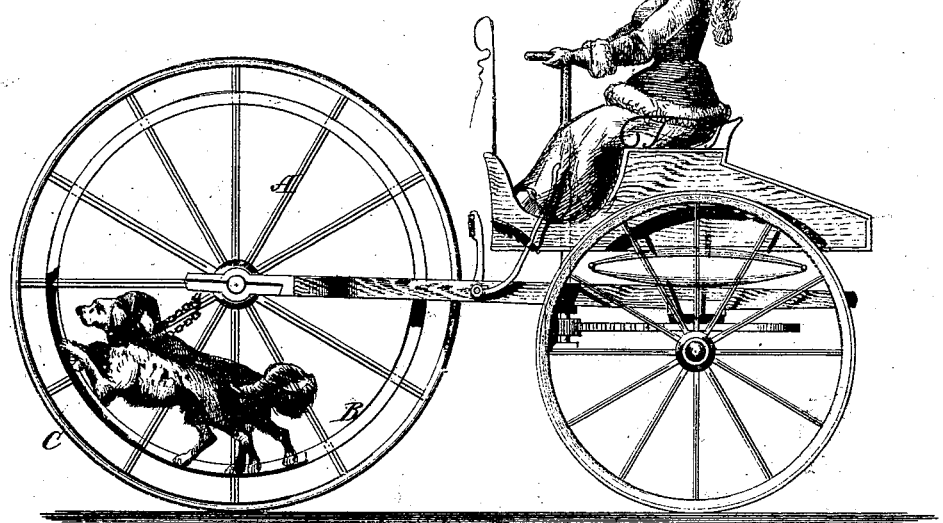
Figure 1 is a side elevation of a vehicle provided with my improvement.
Figure 2:
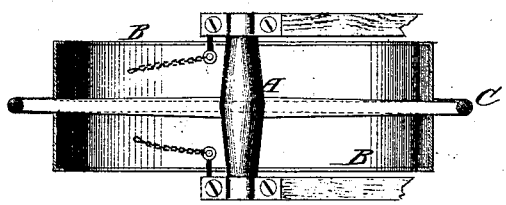
Figure 2 is a horizontal section of the propelling wheel.

The animals being placed in this tread-rim, as represented in fig. 2, and caused to work, will impart motion to the wheel and to the vehicle, as will be clearly understood.

Having thus described my invention,

I claim as new and desire to secure by Letters Patent—

The combination of wheel A B C with a pair of wheels and body to form the running-gear of a vehicle, in the manner shown and described.

F. H. C. MEY.

Witnesses:
T. F. TAYLOR,
J. H. YERKES.